Aug. 23, 1949.                B. WILLIAMS                2,479,800
            TRUCK FOR TRANSPORTING AND SPREADING MATERIAL
Filed Feb. 28, 1947                                  2 Sheets-Sheet 1
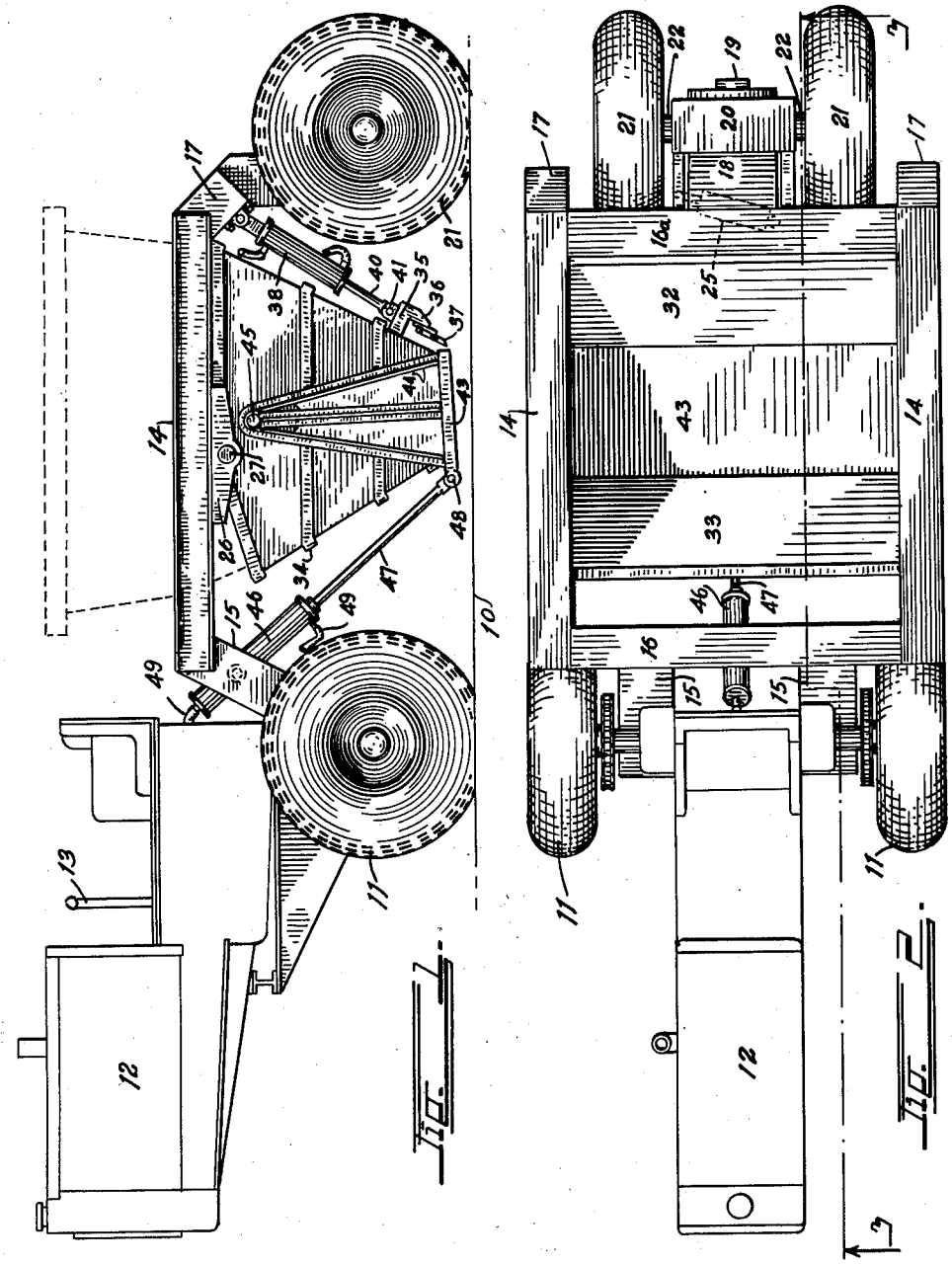
INVENTOR.
BERNARD WILLIAMS.
BY
Martin E. Anderson
        ATTORNEY.

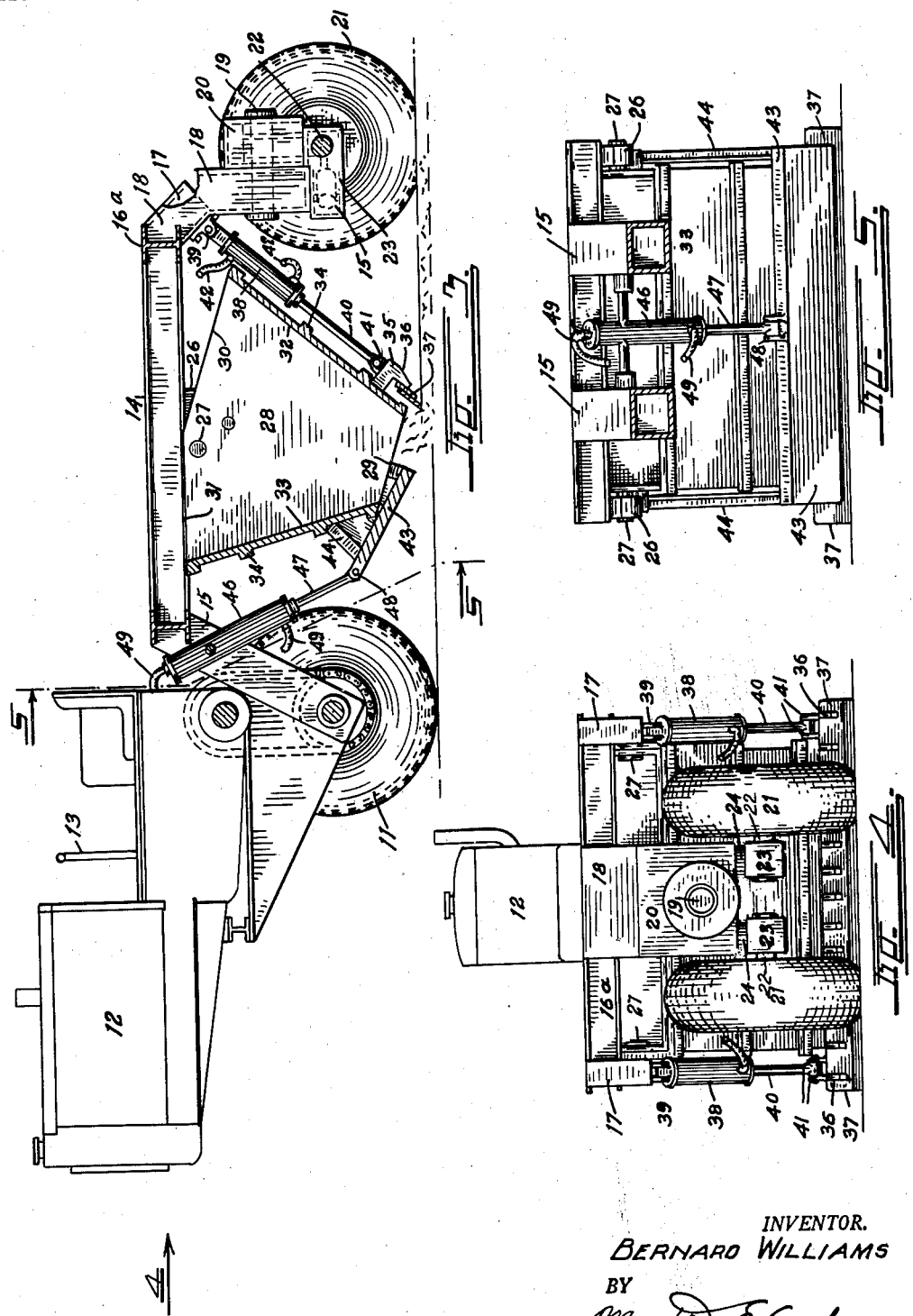

Patented Aug. 23, 1949

2,479,800

UNITED STATES PATENT OFFICE 2,479,800

TRUCK FOR TRANSPORTING AND SPREADING MATERIAL

Bernard Williams, Casper, Wyo.

Application February 28, 1947, Serial No. 731,595

6 Claims. (Cl. 94—44)

This invention relates to improvements in machines for hauling and distributing materials and has reference more particularly to a power operated truck and the mechanism by means of which the material is transported and uniformly distributed over a surface.

In many places and more particularly in connection with road making, it is necessary to transport material such as sand, gravel, crushed rock and concrete and to distribute the same in a layer of uniform depth over the surface of the road.

Such machines are of a massive construction and the one to which this invention relates has a carrying capacity of twenty tons. Of course it is necessary that such machines be of a strong and rigid construction and that they be provided with power operated means for controlling the position of the parts during the transportation of the machine and during the spreading operation. It is also quite essential that such machines shall be provided with a hydraulic steering mechanism because, due to the condition of the surface on which the machine usually operates and the heavy loads and massive construction, it is not practical to steer by the usual hand operated device.

It is an object of this invention to produce a machine of the type specified that shall be so designed and constructed that it will have a large capacity and great strength in proportion to the weight of the material employed.

Another object of the invention is to produce a machine in which the load carrying hopper is suspended and so related to the frame work of the machine that it will be movable in response to gravitational forces into a position for material distribution and which can be held in adjusted position by means of hydraulic rams.

A further object of the invention is to produce a machine having a downwardly tapering road carrying hopper provided at its bottom with an opening through which the material is discharged, which opening can be closed or maintained in any partially open position by means of a pivoted door or gate whose movement is effected by a hydraulic ram and which is held in adjusted position thereby.

Another object of the invention is to produce a construction in which the levelling blade is rigidly connected with the load carrying can and held in a predetermined relative vertical position with respect thereto and which will, therefore, always be properly positioned to effect a uniform distribution of the material regardless of the thickness of the layer.

Another object of the invention is to produce a machine having a load carrying hopper that is supported by pivots positioned slightly to the front of its center of mass so that it tends to rotate about such pivots in response to the action of gravity and which is held in adjusted position by powerful hydraulic rams.

A further object of the invention is to provide a construction in which the door or gate is supported by pivots so related to the opening that the latter can be closed by means of a flat gate thereby obviating the necessity of providing a curved opening.

The above and any other objects that may become apparent as this description proceeds are attained by means of a construction and an arrangement of parts that will now be described in detail and for this purpose reference will be had to the accompanying drawings in which the invention has been illustrated in its preferred form, and in which:

Figure 1 is a side elevation of the truck or machine showing the parts in position for transporting materials and indicating by means of broken lines the manner in which the materials carrying hopper may be increased in capacity;

Figure 2 is a top plan view of the machine shown in Figure 1;

Figure 3 is a section taken on line 3—3, Figure 2, and shows the parts in materials distributing position;

Figure 4 is a front elevation of the machine looking in the direction of arrow 4 in Figure 3; and Figure 5 is a section taken on line 5—5, Figure 3.

In the drawing reference numeral 10 designates the surface of a roadway. The machine or truck consists of a tractor part having two independently rotatable drive wheels 11 to which power is transmitted by the usually approved mechanisms, from an engine located in the housing designated by reference numeral 12. The power transmitting means has not been shown because such tractor units are old and this invention does not relate in any way to the construction of this unit. However, it may be said that the tractor unit is controlled as to direction by means of a lever that has been indicated in a general way in Figure 1 and designated by reference numeral 13. This lever controls a clutch by means of which power may be transmitted to either one of the drive wheels or simultaneously to both.

Connected with the tractor unit is a chassis comprising spaced horizontal side members 14 formed from channel iron, as shown, or from any other form of structural beams of sufficient strength to support the heavy loads and to resist the heavy strains to which they are subjected. The front ends of the side beams are connected with the tractor element by means of box girders 15 that project downwardly and forwardly from the under side of the transverse beam 16. The rear ends of the side beams are connected by a transverse beam 16a. Short downwardly and rearwardly inclined members 17 extend from the rear ends of side members 14 for a purpose which will hereinafter appear. At a point substantially midway between side beams 14, there is a builtup, downwardly and rearwardly extending bracket 18 to which the rear wheel assembly is connected for rocking movement about pivot 19. The rear axle assembly consists of a substantially rectangular bearing block 20 supported by pivot 19 for rocking movement relative to the part 18. The rear wheels 21 are mounted on axles 22 projecting outwardly from blocks 23, which, in turn, are connected with block 20 by means of vertical pivots 24. Blocks 23 extend forwardly of the vertical pivots 24 and are connected to hydraulic rams 25 by means of which the wheels are turned about pivots 24 for the purpose of guiding the machine. The steering mechanism has not been illustrated in detail and the hydraulic steering mechanism has therefore been indicated in a general way by means of broken lines.

Secured to the under sides of each side beam 14 is a bearing block 26 that may be welded to the lower flange of the beam or secured thereto by bolts or in any other suitable way. Each block is provided with an opening forming a bearing for a trunnion 27 that extends outwardly from the can in a manner shown in Figure 5.

The hopper comprises a box-like structure having flat sides 28 that have the general shape of a truncated triangle, the narrow end of which is at the bottom and has been designated by reference numeral 29. The base or the upper edge of the triangular plate has been shown formed by two angularly related lines 30 and 31. The inclined edges are connected by heavy plates 32 and 33 that are provided on their outer surfaces with reenforcing beams 34. It will be noted from Figure 3 that trunnions 27 are located to the front of the median line of the triangular sides and therefore the hopper that has just been described, will have its center of gravity positioned to the rear of trunnions 27, wherefore it will always tend to move about the trunnions in a clockwise direction into the position shown in Figure 3. With the construction shown in Figure 3, the load supporting hopper is in its extreme lowermost position because the edges 31 of the sides are in contact with the under surfaces of beams 14. Secured to the outer surface of plate 32 are a number of lugs 35 that have a somewhat bell-crank shape, the free ends or arms of which have been designated by reference numeral 36. Scraper blades 37 are connected with the arms 36 and are therefore held in a fixed relation with respect to the plane of the opening in the bottom of the hopper. Means for tilting the hopper about its trunnions is provided, which means consists of two hydraulic rams, each having a cylinder 38 pivoted at 39 to the under side of the downwardly inclined projections 17, as shown more particularly in Figures 3 and 4. Piston rods 40 have their upper ends connected with pistons located in the cylinders, in the usual way, and their lower ends positioned between and pivotally connected with the pairs of upwardly extending lugs 41. Opposite ends of cylinders 38 are provided with conduits 42 through which liquid, such as oil under high pressure, may be transmitted to either end of the cylinder for the purpose of moving and positioning the piston therein. It is evident that if oil under pressure is introduced into the cylinders through the lowermost conduit 42, the piston will move upwardly, thereby turning the load carrying hopper in a counterclockwise direction when viewed as in Figure 3. By means of suitable valves, the pistons may be held immovable in any intermediate position.

The liquid employed in connection with the hydraulic rams is provided by a pump operated by the engine of the tractor which has not been shown because it is now very common to provide tractors of all kinds with high pressure pumps, reservoirs and valves for controlling liquids employed in connection with hydraulic rams that form operative means for various mechanisms.

The opening in the bottom of the hopper is controlled by means of a door comprising a flat plate 43 whose ends are secured to upwardly extending triangular arms 44 whose upper ends are secured to the sides of the hopper by means of pivots 45, all in the manner most clearly shown in Figure 1 in which figure the door is shown in closed position and the hopper is shown in elevated position for transporting materials to the place of distribution. The door 43 is controlled by a hydraulic ram comprising a cylinder 46 that is mounted for pivotation between the box girders 15 in the manner shown most clearly in Figure 5. Piston rod 47 connects a piston within cylinder 46 to the front edge of door 43 by means of a pivot 48. Conduits 49 are in communication with opposite ends of cylinder 46 and serve to conduct oil or other fluid under pressure to and from the cylinder.

If oil is introduced into cylinder 46 through the lowermost conduit 49, the piston and piston rod will move upwardly and swing the door forwardly into a position somewhat like that shown in Figure 3. The position of the hopper is controlled, as has already been explained, by the two hydraulic rams whose cylinders have been designated by reference numerals 38. It is evident that if the hopper is rotated, in a clockwise direction, from the position shown in Figure 1, blades 37 will move downwardly and if the machine is moving forwardly or to the left, as shown in Figures 1 and 3, the material that is discharged from the hopper will be subjected to a scraping action by blades 37 by which means the thickness of the layer can be controlled and a smooth upper surface is thus provided.

Having described the invention what is claimed as new is:

1. A materials transporting and spreading device comprising, a vehicle including a frame, a material carrying hopper pivotally supported by said frame on a substantially horizontal axis, said hopper having an opening at its bottom, a closure member pivotally suspended from the hopper for varying the size of said opening means for operating said closure, a scraper fixed to a rear wall of said hopper adjacent said opening and movable with the hopper adapted to spread and smooth material deposited through said opening to variable thickness, depending upon the angular position of said hopper with respect to said frame, and operative means between the hopper and the frame for selectively adjusting the position of said hopper about its pivotal axis.

2. A materials transporting and spreading truck comprising an elongated frame supported at opposite ends by front and rear wheels and adapted to be drawn by a tractor, a downwardly tapering materials carrying hopper pivotally suspended from the frame about an axis transverse thereto and between the front and rear wheels, the lower end of the hopper having an opening extending substantially the entire width of the hopper, a door for closing the opening and controlling the flow of material therethrough, the ends of said door having upwardly extending links rigidly secured thereto at its transverse ends and pivotally connected to said hopper below the hopper pivot axis, operable means connecting the door with the frame at a point forward of the hopper for adjusting the door with respect to the opening, operable means connecting the rear of the hopper with the frame at a point rearwardly thereof, for adjusting the hopper angularly about its pivotal axis, and a scraper blade fixedly supported by the rear wall of the hopper adjacent the lower end thereof for spreading material from the opening as the truck moves forward, whereby the thickness of spread of the material on the ground is determined by the position of the hopper about its pivotal axis.

3. A device in accordance with claim 2 wherein the first adjusting means comprises a member of variable length pivotally connected at one end to the frame ahead of the hopper and at its other end to the door, and said means for adjusting the hopper angularly comprises a similar member pivotally connected at one end to the frame behind the hopper and at its other end to the rear of the hopper.

4. A materials transporting and spreading truck comprising, an open frame supported at its front end on a tractor and at its rear end by two laterally spaced wheels, the frame having two spaced side frames, a downwardly tapering hopper pivotally suspended from the side frame members on a transverse axis, the lower end of the hopper having a materials discharge opening, hydraulic means comprising, a cylinder and a piston, interconnecting the frame and the hopper for adjusting its position relative to the frame, a door of a size to close the opening in the hopper, supporting links connected with the ends of the door, projecting upwardly, means comprising pivots for connecting the upper ends of the links to the sides of the hopper, means comprising a hydraulic cylinder and piston, interconnecting the forward edge of the door with that part of the frame to the front of the hopper for adjusting the position of the door relative to the opening, and a spreading blade secured to the hopper to the rear wall thereof, the blade projecting below the rear wall of the hopper when the parts are adjusted for distributing and spreading material.

5. A materials transporting and spreading truck comprising, a substantially rectangular open frame, the front end having forwardly and downwardly ranging elements for effecting connection with a tractor, the rear end having a downwardly ranging member for effecting connection with a pair of spaced supporting wheels, a downwardly tapering materials carrying hopper suspended from the sides of the frame, the frame and hopper having cooperating bearings and trunnions positioned in transverse axial alignment, whereby the hopper may be rotatably adjusted relative to the frame, the lower end of the hopper having a materials discharge opening extending substantially the entire width of the hopper, a door for closing the opening and for controlling the flow of materials from the hopper, comprising a door of a size and shape to close the opening when it is in one position, the ends of the door having upwardly extending links, means for effecting a pivotal connection between the hopper and the upper ends of the links, comprising aligned pivots, means for adjusting the hopper angularly about its pivot, means comprising a hydraulic cylinder and piston for effecting a connection between the door and the frame, in front of the hopper, for adjusting the position of the door with respect to the opening in the hopper, and a scraper blade supported by the rear wall of the hopper adjacent the lower end thereof, for spreading material flowing from the opening as the truck moves forwardly.

6. A materials transporting and spreading truck comprising, an open substantially rectangular frame, means comprising a tractor, supporting the front end of the frame and two laterally spaced dirigible wheels supporting the rear end, bearing blocks secured to the under sides of the frame members, a materials carrying hopper suspended for pivotal movement from the bearings, the point of pivotation of the hopper being in front of a vertical plane passing through its center of mass, the bottom of the hopper having a materials discharge opening extending the entire width of the hopper, a door of a size and shape to close the opening, the ends of the door having its ends provided with supporting arms extending upwardly along the side walls of the hopper, the arms having their ends pivoted to the side walls at a point to the rear of a vertical plane passing through the hopper pivots, means for moving the hopper about its pivots to adjust the distance from a supporting surface to the lower end of the rear hopper wall, a spreading blade rigidly connected with the rear hopper wall at a point slightly to the rear thereof, and means comprising a hydraulic cylinder and piston, interconnecting the front edge of the door with a portion of the frame in front of the hopper, for moving the door relative to the hopper opening.

BERNARD WILLIAMS.

REFERENCES CITED

The following references are of record in the file of this patent:

UNITED STATES PATENTS

| Number | Name | Date |
|---|---|---|
| 812,100 | Thomas | Feb. 6, 1906 |
| 880,054 | Van Arsdale | Feb. 25, 1908 |
| 1,749,805 | Elliott | Mar. 11, 1930 |
| 1,973,885 | Rasmussen | Sept. 18, 1934 |
| 1,994,812 | Deicke | Mar. 19, 1935 |

FOREIGN PATENTS

| Number | Country | Date |
|---|---|---|
| 824,601 | France | Feb. 11, 1938 |